Aug. 8, 1950     E. R. JOHNSON ET AL     2,518,016
COOLED DISK-TYPE BRAKE

Filed July 16, 1946     5 Sheets—Sheet 1

Inventors
Harland W. Cardwell and
Earl R. Johnson
By Bacon & Thomas
Attorneys

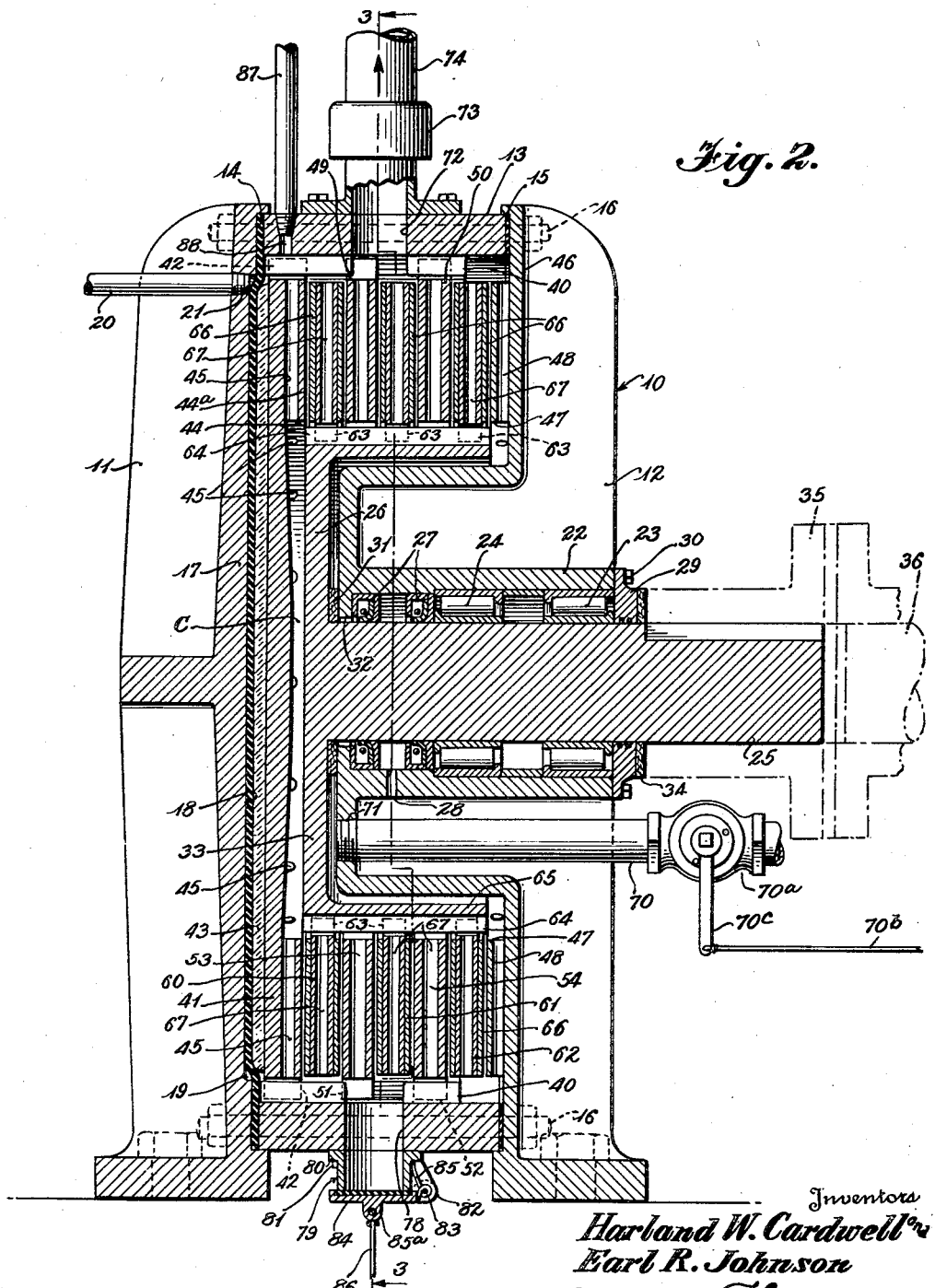

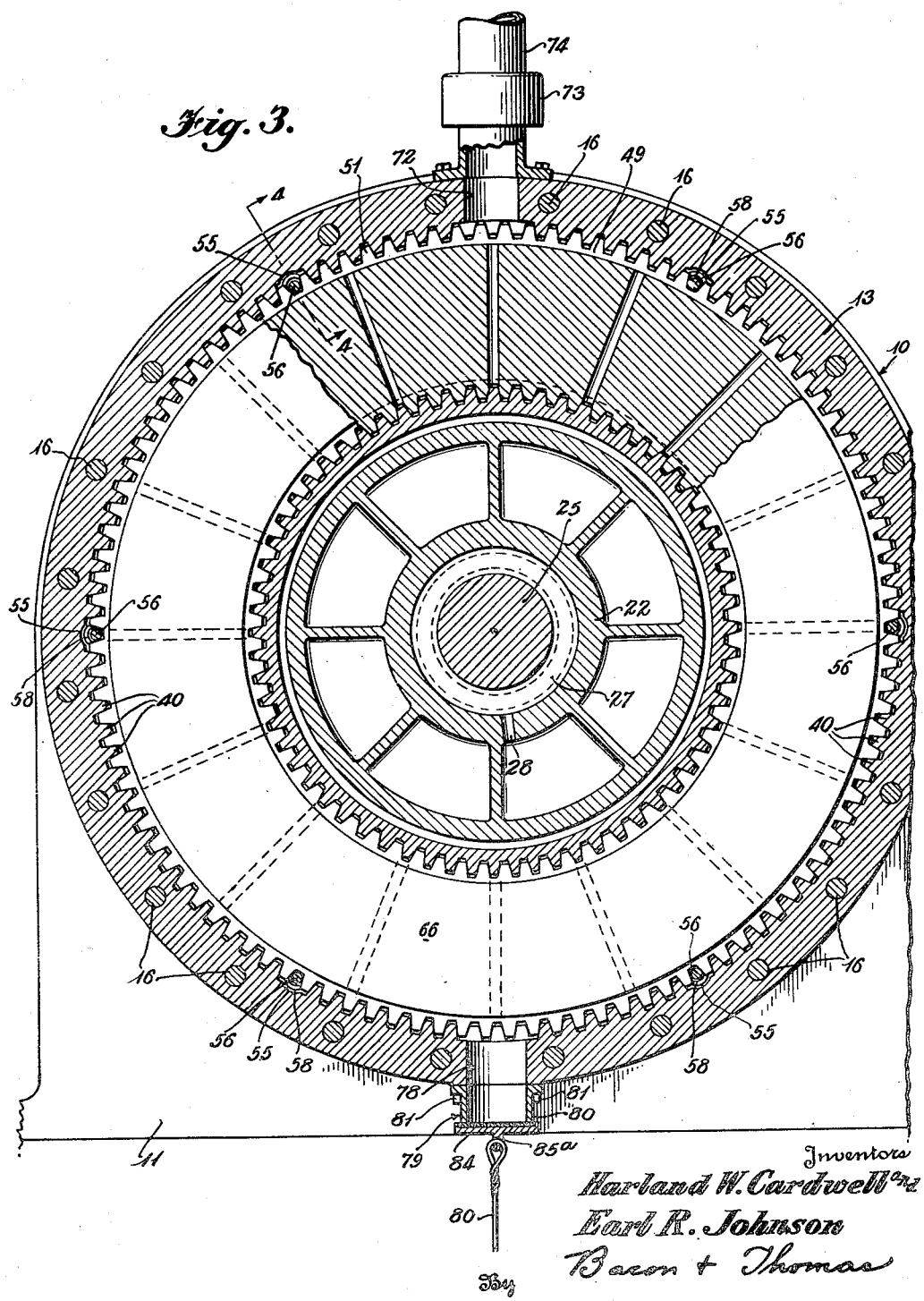

Aug. 8, 1950  E. R. JOHNSON ET AL  2,518,016
COOLED DISK-TYPE BRAKE

Filed July 16, 1946  5 Sheets-Sheet 4

Inventors
Harland W. Cardwell and
Earl R. Johnson
By Bacon + Thomas
Attorneys

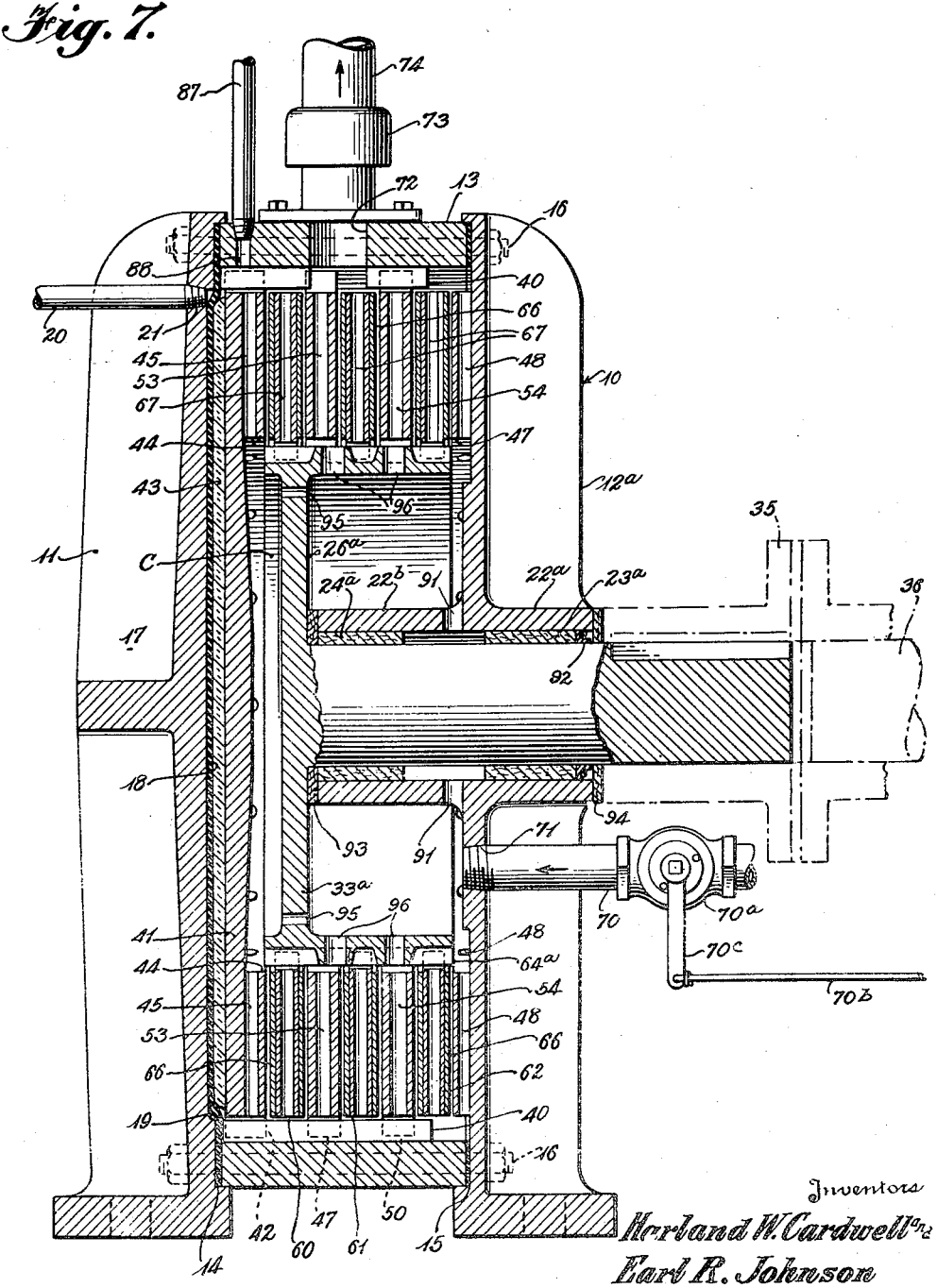

Patented Aug. 8, 1950

2,518,016

UNITED STATES PATENT OFFICE 2,518,016

COOLED DISK-TYPE BRAKE

Earl R. Johnson and Harland W. Cardwell, Wichita, Kans., assignors to Cardwell Manufacturing Company, Inc., Wichita, Kans.

Application July 16, 1946, Serial No. 683,863

17 Claims. (Cl. 188—71)

The present invention relates to brakes and more particularly to disc-type brakes adapted to be operated by air or other fluid under pressure and also adapted to be cooled by any suitable cooling medium.

The principal object of the invention is to provide a heavy duty, liquid or air-cooled brake constructed to effect a maximum of cooling of all of the elements thereof which become heated by friction developed during the application of the brake.

Another object of the invention is to provide a brake of the disc type constructed so that a cooling medium is positively circulated through all of the discs thereof when the brake is being applied.

A further object of the invention is to provide a fluid pressure operated brake employing an actuating diaphragm, and in which the diaphragm is substantially completely protected from the heat developed by friction during the application of the brake.

Still another object of the invention is to provide a brake in which the cooling liquid can be quickly dumped from the brake housing, at will, to enable rapid release of the brake and prevent frictional drag of the brake mechanism in the cooling liquid when the brake is in the released position.

A further object of the invention is to provide means for interrupting the flow of cooling liquid to the brake housing simultaneously with the dumping of the liquid from the brake housing.

A still further object of the invention is to provide a fluid pressure operated brake of the disc type in which the pressure of the cooling medium serves to assist in effecting release of the disc elements upon the exhaust of operating fluid.

Other objects and features of the invention will be apparent from the following description taken in conjunction with the accompanying drawings, in which:

Fig. 2 is an enlarged vertical sectional view through the brake taken on the line 2—2 of Fig. 1;

Fig. 3 is a vertical sectional view taken on the line 3—3 of Fig. 2;

Fig. 7 is a sectional view similar to Fig. 2, illustrating a modified form of brake construction.

Figure 1:
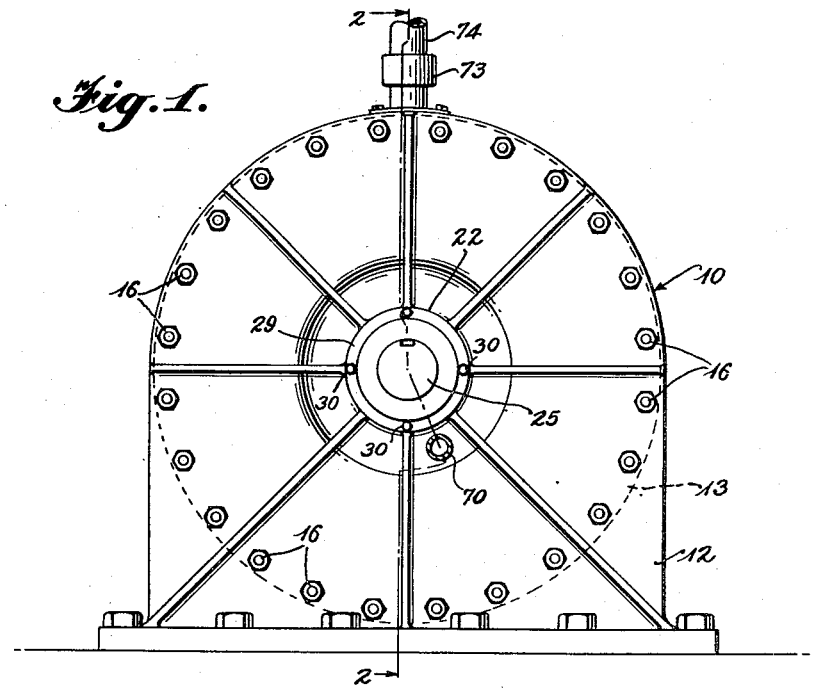
Fig. 1 is a right end elevational view of a brake constructed in accordance with the principles of the present invention.

Referring now to Figs. 1 to 3, inclusive, of the drawings, the brake housing is generally identified by the numeral 10 and includes end sections 11 and 12 having an annular section 13 disposed therebetween. A circular diaphragm 14 is clamped at its margin between the inner face of the housing section 11 and the adjacent face of the annular section 13, and a suitable gasket 15 is clamped between the housing section 12 and the other face of said annular section, the several parts mentioned being held and maintained in assembled relation by a plurality of bolts 16.

The housing section 11 includes a wall 17 having a flat inner surface 18 which confronts the diaphragm 14. The face 18 and the outer face of the diaphragm 14 cooperate to provide a pressure chamber 19. A pipe 20 has one end thereof threaded into an opening 21 formed in the wall 17 and its other end connected with a source of supply of operating fluid, preferably air under pressure (not shown).

The housing section 12 has a central hub portion 22 containing any suitable or conventional antifriction bearings, for example, roller bearings 23 and 24 which provide an antifriction mounting for the shaft portion 25 of a rotor 26. Conventional shaft packing elements 27 are disposed around the shaft portion 25 at the inner end of the hub 22. The hub portion 22 is provided with an opening 28 to permit the escape of any liquid that leaks past the innermost shaft packing 27. A plate 29 retains the roller bearings 23 and 24 within the hub 22 and is secured to said hub by bolts 30. A non-metallic thrust washer 31 is disposed between a flange 32 at the inner end of the hub 22 and a vertical wall 33 of the rotor 26. A second non-metallic thrust washer 34 is disposed between the plate 29 and a hub element 35 mounted on the rotor shaft 25, Fig. 2. The hub element 35 may take the form of a coupling hub to connect the rotor shaft portion 25 with the shaft 36 whose rotation is to be controlled by the brake, as shown, or a gear or sprocket hub to connect said rotor shaft portion with a shaft (not shown) whose rotation is to be controlled by said brake.

The annular housing section 13 is provided on the inner surface thereof with a plurality of axially extending splines or teeth 40, which terminate short of the housing section 12. A circular backing plate 41 is disposed in confronting relation with the vertical wall portion 33 of the rotor 26 and is provided with teeth 42 that mesh with the splines 40 and prevent relative rotation of said backing plate 41 with respect to said annular housing section. A disc of heat insulating material 43, such as "Masonite" die stock or laminated phenolic resin material or any other satisfactory material, is suitably mounted upon the outer surface of the backing plate 41 and is normally engaged by the inner surface of the flexible diaphragm 14. The inner surface of the backing plate 41 carries an inwardly projecting or raised, wide annular rib 44 providing a brake surface 44ᵃ. The annular rib 44 is provided with a series of radially extending passages 45 adapted to have a cooling medium circulate therethrough to limit heating of the backing plate 41 as a result of heat developed at the brake surface 44ᵃ.

The housing section 12 includes a vertical wall portion 46 that carries a similar annular, inwardly projecting or raised rib 47 which provides a brake surface 47ᵃ. The rib 47, in effect, serves as a stator disc and is also provided with a plurality of spaced radially extending passages 48 adapted to have a coolant circulated therethrough to absorb the heat developed at the brake surface 47ᵃ.

Figure 4:
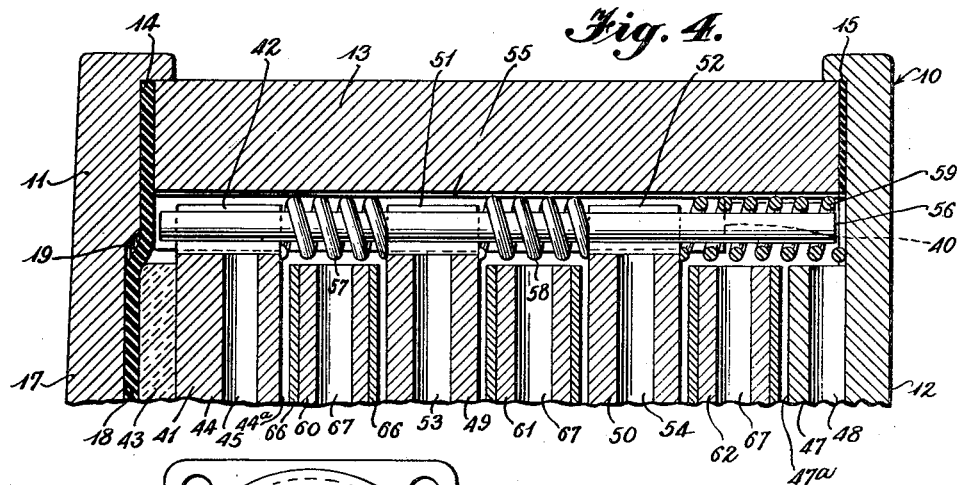
Fig. 4 is an enlarged fragmentary sectional view taken on the line 4—4 of Fig. 3.
Figure 5:
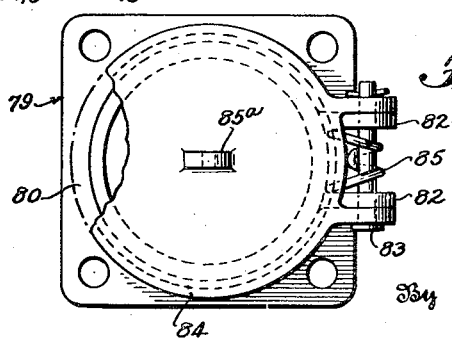
Fig. 5 is an enlarged inverted plan view of the dump valve associated with the brake housing.

Stator discs 49 and 50 are disposed between the annular ribs 44 and 47. The stator discs 49 and 50 are provided with peripheral teeth 51 and 52 which cooperate with the splines or teeth 40 on the housing section 13 to prevent relative rotation of said stator discs with respect to said housing secion. The stator disc 49 is provided with a plurality of radially extending passages 53 adapted to have a cooling medium circulate therethrough and the stator disc 50 is provided with a plurality of similar passages 54. As is best shown in Figs. 3 and 4, the splines are removed from the housing section at the points indicated by the numeral 55 to provide space for a plurality of circumferentially spaced rods 56, which are inserted between aligned teeth 42 of the backing plate 41 and the teeth 51 and 52 of the stator discs 49 and 50, respectively. A spring 57 is mounted on each of the rods 56 between the backing plate 41 and the stator disc 49; another spring 58 is mounted on each of said rods between the stator disc 49 and the stator disc 50; and still another spring 59 is mounted on each of said rods between the stator disc 50 and the housing section 12. A rotor disc 60 is disposed between the annular rib 44 of the backing plate 41 and the stator disc 49, a rotor disc 61 is disposed between the stator discs 49 and 50 and a rotor disc 62 is disposed between the stator disc 50 and the annular rib 47 of the housing section 12. The inner periphery of each of the rotor discs 60, 61 and 62 is provided with axially extending teeth 63 that mesh with splines 64 carried by a wall 65 extending laterally from the vertical wall portion 33 of the rotor 26. Each of the rotor discs 60, 61 and 62 has a layer of metallic or other suitable friction material 66 bonded or otherwise fastened to the opposite sides thereof, and each of said rotor discs is also provided with a plurality of radially extending passageways 67 adapted to have a cooling medium circulate therethrough. The purpose of the springs 57, 58 and 59 is to separate the backing plate 41 and the stator discs 49 and 50 to disengage the same from the rotor discs 60, 61 and 62, upon the release or exhaust of operating fluid from the pressure chamber 19.

Water or other liquid or air for effecting cooling of the brake is introduced into the housing 10 through a pipe line 70 having one end thereof threaded into an opening 71 in the housing section 12 adjacent to the hub portion 22. Liquid is the preferred and most practical cooling medium, although it is contemplated that suitably cooled air may also be employed as a coolant. A conventional rotary plug valve 70ᵃ is connected in the pipe line 70 to control the flow of the cooling medium into the brake housing 10. A rod 70ᵇ is connected to an arm 70ᶜ of the valve 70ᵃ for manually controlling said valve from a remote point. When water is used as a cooling medium, the liquid is discharged from the housing 10 through an opening 72 in the intermediate housing section 13, through a conventional thermostat valve 73 set to open at a desired operating temperature, and finally through a discharge pipe 74 connected with said thermostat valve.

The housing section 13 has a discharge opening 78 in the lowermost portion thereof communicating with a dump valve 79 for manually controlling the discharge of the cooling liquid from the housing 10, at will. The dump valve 79 includes a body 80 secured to the housing section 13 by bolts 81. The body 80 is provided with downwardly projecting ears 82 for the reception of a pin 83 which pivotally connects a gasket-lined cap 84 to the body 80. A torsion spring 85 surrounds the pin 83 and is arranged to normally hold the cap 84 closed drip-tight. A lug 85ᵃ is formed on the cap 82 and one end of a wire or cable 86 is fastened to said lug for permitting manual pivoting of the cap 84 upon the pin 83 to effect opening of the dump valve 79. The dump valve 79 is of large capacity and its purpose is to produce a quick discharge of the cooling liquid from the brake housing 10 in order to minimize friction losses as much as possible.

An air vent pipe 87 has one end thereof threaded into an opening 88 in the housing section 13 and extends only high enough to prevent the cooling liquid from rising out of the top of said vent pipe. In other words, the pipe 87 extends high enough to provide a static head sufficient to offset the inlet pressure of the cooling liquid. The vent pipe 87 serves to automatically admit air into the housing 10 as cooling liquid is drained therefrom upon opening of the dump valve 79, thus facilitating rapid draining of said housing. The vent pipe 87 further serves to automatically exhaust air when the housing 10 is being filled. In the event that the thermostat valve 73 is not used, the vent pipe 87 is unnecessary and can be omitted.

The operation of the brake disclosed herein is as follows:

When it is desired to apply a braking force to the shaft 36, or to a shaft not directly coupled with the shaft portion 25, a valve or other means (not shown) is actuated to admit air or other fluid under pressure through the pipe 20 into the diaphragm chamber 19. The operating fluid thus admitted acts upon the diaphragm 14 causing the same to be flexed toward the right, as viewed in Fig. 2, thereby producing a corresponding shifting of the backing plate 41 in the same direction, with the result that the annular rotor discs 60, 61 and 62 are pressurally engaged with the annular stator discs 49 and 50 and surfaces 44ª and 47ª and rotation of the shaft portion 25 is effectively opposed. The aforesaid pressural engagement of the rotor and stator discs provides a chamber C defined by the inner periphery of the rib 44 and the surface of the backing disc disposed within said rib, the inner periphery of the discs 60, 49, 61, 50 and 62, the inner periphery of the rib 47 and the surface of the housing section 12 disposed inwardly of said rib and outwardly of the thrust washer 31. Accordingly, cooling liquid now introduced into the chamber C through the pipe 70 can only escape from said chamber by flowing through the passages 45 of the rib 44, the passages 67 of the rotor discs 60, 61 and 62, the passages 53 of the stator disc 49, the passages 54 of the stator disc 50, and the passages 48 of the rib 47. Both the thermostat valve 73 and the dump valve 79 are normally closed. However, when the temperature of the liquid within the housing reaches a suitable operating temperature, the thermostat valve 73 will open automatically and allow the cooling liquid to discharge from the brake housing 10 through the pipe 74, the discharged liquid being replaced by cooling liquid admitted through the pipe 70. Thus, positive circulation of cooling liquid through the brake housing 10 is effected and the heat developed by frictional engagement of the various rotor and stator elements is absorbed by the cooling liquid.

In order to release the brake, operating fluid is exhausted through the pipe 20 from the pressure chamber 19 and the springs 57, 58 and 59 function to separate the stator elements from the rotor elements. All drag on the shaft portion 25 caused by the presence of cooling liquid in the housing 10 can be quickly eliminated by manually pulling the cable or wire 86 to effect opening of the dump valve 79. The dump valve 79 is capable of draining cooling liquid from the housing 10 faster than it can be introduced through the pipe 70. Preferably, however, the valve 70ª is manually closed when the dump valve is opened so that the brake housing 10 will become empty very rapidly. The vent pipe 87 functions to admit air into the brake housing 10 whenever necessary to facilitate the draining of liquid from said brake housing and to prevent the creation of a vacuum condition within said housing. Upon closing of the dump valve 79 and opening of the valve 70ª, the housing 10 will again become filled with the cooling liquid.

Figure 6:
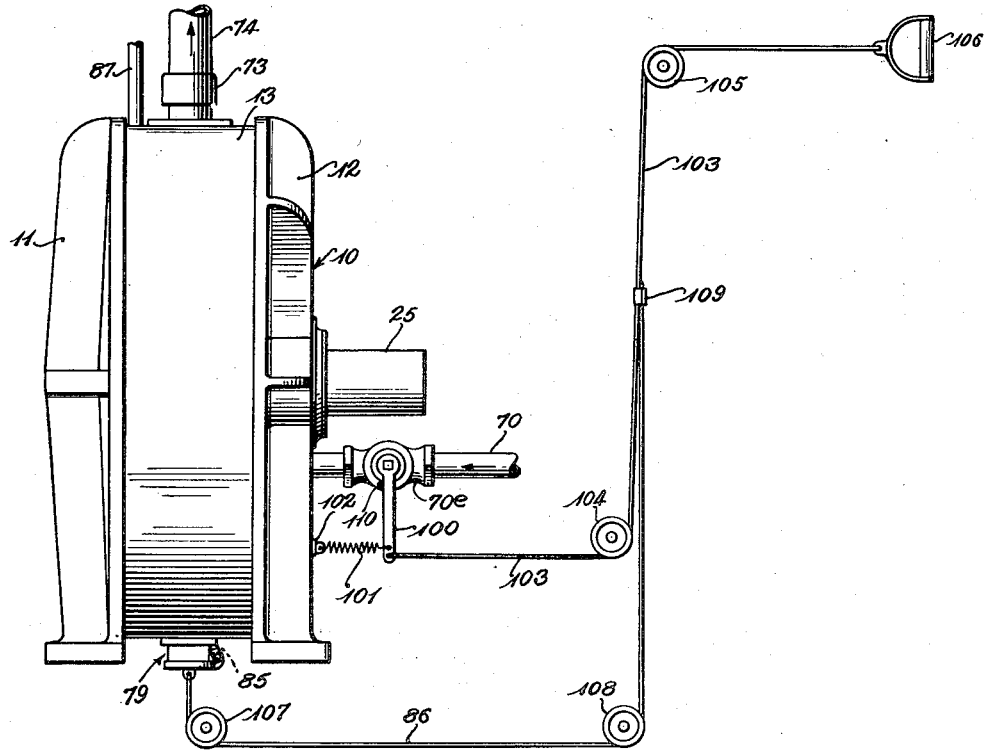
Fig. 6 is a view diagrammatically illustrating the manner in which a cooling liquid supply control valve and a dump valve may be interconnected for simultaneous operation, one to open while the other is closed.

Fig. 6 diagrammatically illustrates an arrangement wherein the operator can simultaneously effect opening of a dump valve and closing of a valve controlling the supply of cooling liquid to the brake housing 10. Thus, a conventional plug type supply valve 70ᶜ is shown connected in the pipe 70. The valve 70ᶜ is provided with the usual operating handle 100 and the free end thereof is connected by a spring 101 to a bracket 102 mounted on the brake housing 10. The spring 101 is arranged to normally actuate the handle 100 to open the valve 70ᶜ. A control cable 103 has one end thereof connected with the valve handle 100 and extends around pulleys 104 and 105 so that the opposite end thereof is connected to a handle 106 within convenient reach of the operator. The cable 86, which is connected with the cover 84 of the dump valve 79, is arranged so that it passes around pulleys 107 and 108 and is connected at 109 with the cable 103, so that when the operator exerts a pull on the handle 106, the cables 86 and 103 will respectively function to simultaneously open the dump valve 89 and to effect closing of the valve 70ᶜ. In this manner, the brake housing 10 can be quickly emptied. Upon release of the handle 106 by the operator, the spring 85 will automatically return the cap 84 to its original position to effect closing of the dump valve 89, and the spring 101 will move the free end of the arm 100 toward the left to effect opening of the supply valve 70ᶜ. A stop 110 may be conveniently associated with the arm 100 to limit the movement thereof by the return spring 101.

Referring now to Fig. 7, this figure illustrates a modified brake construction in which the dump valve 79 has been omitted, but obviously may be included if desired, and in which the housing section 12 has been replaced by a modified housing section 12ª, thus providing a somewhat different mounting for the shaft portion 25 of the rotor and including provision for more effective circulation of the cooling liquid through the discs and housing. In the interest of brevity, the parts of Fig. 7 corresponding to those of Fig. 2 will be referred to by the same reference numeral and only the modified portions of the structure will be described in detail.

The housing section 12ª includes an outwardly extending hub portion 22ª and an inwardly extending hub portion 22ᵇ. The hub portions 22ª and 22ᵇ contain non-metallic water-lubricated bushings 23ª and 24ª, instead of the roller bearings 23 and 24 shown in Fig. 2. Water gains access to the bushings 23ª and 24ª through openings 91 formed in the hub portion 22ᵇ. A conventional shaft seal 92 surrounds the shaft portion 25 and is disposed outwardly of the bushing 23ª to prevent leakage of cooling liquid from the housing 10 along the shaft portion 25. A thrust washer 93 is disposed between the end of the hub portion 22ᵇ and a vertical wall portion 33ª of the rotor 26ª. A thrust washer 94 is disposed between the outer end of the hub portion 22ª and the hub element 35.

In order to facilitate circulation of the cooling medium within the brake housing 10, the wall portion 33ª may be provided with openings 95 enabling the cooling medium to quickly gain access to the inner ends of the passages 45 in the rib 44. Also, rotor teeth 64ª aligned with the passages 67 in the rotor discs may be provided with slots 96 to facilitate access of the cooling medium thereto.

The operation of the brake construction shown in Fig. 7 is substantially the same as that shown in Fig. 2. In either type of brake, the construction is such that the pressure of the cooling medium can be utilized to assist in effecting quick release of the pressure acting on the rotor and stator discs. Thus, when the operating fluid is exhausted from the chamber 19, the pressure of the cooling medium in the chamber C acts upon the area of the backing plate 41 lying within the inner periphery of the annular rib 44 and tends to shift said backing plate toward the left to assist in the rapid exhaust of operating fluid from the chamber 19. Such pressure action on the backing plate 41 will supplement the action of the springs 57, 58 and 59 in effecting quick disengagement of the rotor discs 60, 61 and 62 from the surface 44ᵃ of the rib 44, the opposed surfaces of the stator discs 49 and 50 and the surface 47ᵃ of the rib 47, thus quickly relieving all frictional drag on the shaft 25. The aforementioned pressure action provides satisfactory operation even when the springs 57, 58 and 59 are omitted, and said springs can, therefore, be omitted, if desired.

Figure 8:
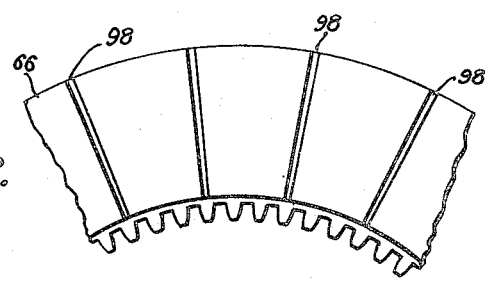
Fig. 8 is a fragmentary view of a modified form of rotor disc.

While internal passageways 67 have been shown in the rotor discs 60, 61 and 62 for the passage of a cooling medium, it will be understood that these may be replaced or supplemented by radial grooves 98 in the exposed surface of the friction material 66, as indicated in Fig. 8.

It will be understood that various changes may be made in the details of construction and in the arrangement of the parts of the brake devices illustrated and described herein, and it will be further understood that the number of rotor and stator discs may be varied as desired, without departing from the spirit of the invention or the scope of the annexed claims.

We claim:

1. A brake comprising: a housing serving as a stator; a rotor in said housing; at least one annular stator disc carried by said housing; at least one annular rotor disc carried by said rotor, said annular stator and rotor discs each having a plurality of generally radially disposed passages extending therethrough from the inner to the outer periphery thereof and in a zone substantially medially of the sides thereof; and means for circulating a cooling medium through said passages to effect cooling of said discs.

2. A brake comprising: a rotor; a stator providing a housing for said rotor; cooperating stator and rotor discs in said housing; means for introducing a cooling liquid into and discharging said cooling liquid from said housing to effect cooling of said stator and rotor discs; and a normally closed dump valve manually operable at will to effect rapid draining of the cooling liquid from said housing independently of said cooling liquid discharging means.

3. A brake comprising: a rotor; a stator providing a housing for said rotor; stator discs splined to said housing; rotor discs splined to said rotor and disposed between said stator discs, said rotor and stator discs having generally radially extending passageways for the passage of a cooling liquid therethrough; means for circulating the cooling liquid through said housing and said passageways to effect cooling of said rotor and stator discs; and a normally closed dump valve manually operable to effect rapid draining of cooling liquid from said stator housing.

4. A brake comprising: a housing; a rotor journalled in said housing; a diaphragm in said housing cooperating with one wall thereof to provide a chamber for operating fluid under pressure; means for admitting operating fluid into and exhausting operating fluid from said chamber; at least one rotor disc in said housing carried by said rotor; a non-rotatable backing plate in said housing actuatable by said diaphragm disposed between said diaphragm and said rotor disc, said backing plate including a raised annular rib portion confronting one side of said rotor disc and having passages extending generally radially through said annular rib portion; and means for circulating a cooling medium through said housing and through said passages of said annular rib portion to effect cooling thereof.

5. A brake comprising: a housing; a rotor journalled in said housing; a diaphragm in said housing cooperating with one wall thereof to provide a chamber for operating fluid under pressure; means for admitting operating fluid into and exhausting operating fluid from said chamber; at least one rotor disc in said housing carried by said rotor; a non-rotatable backing plate in said housing actuatable by said diaphragm disposed between said diaphragm and said rotor disc; and heat insulating material disposed between said diaphragm and backing plate to prevent the transfer of heat from said backing plate to said diaphragm.

6. A brake comprising: a housing including an end section provided with an annular rib portion having a plurality of generally radially disposed passages extending therethrough; a rotor journalled in said housing; a rotor disc carried by said rotor; means for effecting engagement of said rotor disc with said annular rib portion; and means for circulating a cooling medium through said passages of said annular rib portion to effect cooling thereof.

7. A brake comprising: a housing including end sections and an annular section between said end sections; a diaphragm in said housing disposed between one of said end sections and said annular section, and cooperating with said end section to provide a chamber for operating fluid under pressure; means for admitting operating fluid into and exhausting operating fluid from said chamber; a backing plate in said housing non-rotatably carried by said annular section and arranged to be actuated by said diaphragm; a rotor journalled in the other of said end sections of said housing; at least one rotor disc carried by said rotor, said other end section of said housing having an annular rib portion on the inner side thereof and having a plurality of passages extending generally radially therethrough; and means for circulating a cooling medium through said passages of said annular rib portion.

8. A brake comprising: a housing including end sections and an annular section between said end sections; a diaphragm in said housing disposed between one of said end sections and said annular section, and cooperating with said end section to provide a chamber for operating fluid under pressure; means for admitting operating fluid into and exhausting operating fluid from said chamber; a backing plate in said housing non-rotatably carried by said annular section and arranged to be actuated by said diaphragm, said backing plate having an annular rib portion on the inner side thereof provided with a plurality of generally radially extending passages; a rotor journalled in the other of said end sections of said housing; at least one rotor disc carried by said rotor, said other end section of said housing having an annular rib portion on the inner side thereof and having a plurality of passages extending generally radially therethrough; and means for circulating a cooling medium through said passages of both of said annular rib portions.

9. A brake comprising: a housing including end sections and a generally annular section disposed between said end sections; a rotor journalled in one of said end sections; a plurality of rotor discs carried by said rotor, said one end section having an annular surface on the inner side thereof cooperable with one of said rotor discs; a plurality of stator discs within said housing disposed between adjacent rotor discs; a backing plate within said housing having an annular surface on the inner side thereof adapted to engage an adjacent rotor disc; a disc of insulating material overlying the outer side of said backing plate; a diaphragm disposed between said disc of insulating material and the other of said end sections of said housing and cooperating therewith to provide a chamber for operating fluid under pressure; means for admitting operating fluid into and exhausting operating fluid from said chamber; and means for circulating a cooling medium through said housing to effect cooling of said rotor and stator discs.

10. A brake comprising: a housing including end sections and a generally annular section disposed between said end sections; a rotor journalled in one of said end sections; a plurality of rotor discs carried by said rotor, said one end section having an annular surface on the inner side thereof cooperable with one of said rotor discs; a plurality of stator discs within said housing disposed between adjacent rotor discs; a backing plate within said housing having an annular surface on the inner side thereof adapted to engage an adjacent rotor disc; a disc of insulating material overlying the outer side of said backing plate; a diaphragm disposed between said disc of insulating material and the other of said end sections of said housing and cooperating therewith to provide a chamber for operating fluid under pressure; means for admitting operating fluid into and exhausting operating fluid from said chamber; means for circulating a cooling liquid through said housing to effect cooling of said rotor and stator discs; a normally closed dump valve manually operable to effect rapid draining of the cooling liquid from said housing; and means for admitting air into said housing as said cooling liquid is being drained therefrom.

11. A brake comprising: a rotor; a stator providing a housing for said rotor; cooperating stator and rotor disc means in said housing; means including a supply control valve for introducing a cooling liquid into said housing to effect cooling of said stator and rotor discs; means for normally discharging said cooling liquid from said housing; a normally closed dump valve for effecting rapid draining of cooling liquid from said housing; and means for substantially simultaneously effecting opening of said dump valve and closing of said supply control valve.

12. A brake comprising: a housing; a rotor journaled in said housing; a diaphragm in said housing cooperating with one wall thereof to provide a chamber for operating fluid under pressure; means for admitting operating fluid into and exhausting operating fluid from said chamber; at least one rotor disc in said housing carried by said rotor, said rotor disc having passages extending generally radially thereof; a non-rotatable backing plate in said housing actuatable by said diaphragm disposed between said diaphragm and said rotor disc, said backing plate including a raised annular rib portion confronting one side of said rotor disc and having passages extending generally radially through said annular rib portion; and means for circulating a cooling medium through said housing and through said passages of said rotor disc and said annular rib portion to effect cooling thereof.

13. A brake comprising: a housing including an end section provided with an annular rib portion having a plurality of generally radially disposed passages extending therethrough; a rotor journalled in said housing; a rotor disc carried by said rotor, said rotor disc having passages extending substantially radially thereof; means for effecting engagement of said rotor disc with said annular rib portion; and means for circulating a cooling medium through said passages of said rotor disc and said annular rib portion to effect cooling thereof.

14. A brake comprising: a housing; a backing plate in said housing non-rotatably carried by said housing, said backing plate having an annular rib portion on the inner side thereof provided with a plurality of generally radially extending passages, said housing having an annular rib portion on the inner side thereof and having a plurality of passages extending generally radially therethrough; a rotor journalled in said housing; at least one rotor disc carried by said rotor disposed between said annular rib portions and provided with passages extending substantially radially thereof; means for circulating a cooling medium through all of said passages; and means for effecting movement of said backing plate toward said rotor disc.

15. A brake comprising: a housing including end sections and a generally annular section disposed between said end sections; a rotor journalled in one of said end sections; a plurality of rotor discs carried by said rotor, said one end section having a rib on the inner side thereof cooperable with one of said rotor discs; a plurality of stator discs within said housing disposed between adjacent rotor discs; a backing plate within said housing having a rib on the inner side thereof adapted to engage an adjacent rotor disc, said ribs and discs having passages extending generally radially thereof; a disc of insulating material overlying the outer side of said backing plate; a diaphragm disposed between said disc of insulating material and the other of said end sections of said housing and cooperating therewith to provide a chamber for operating fluid under pressure; means for admitting operating fluid into and exhausting operating fluid from said chamber; and means for circulating cooling liquid through all of said passages to effect cooling of said backing plate, said one end section and said rotor and stator discs.

16. A brake comprising: a rotor; a stator providing a housing for said rotor; a set of annular stator discs within and secured to said housing; a set of annular rotor discs within said housing mounted on said rotor and disposed between said stator discs, said rotor and stator discs, respectively, having generally radial internal passageways extending from the inner to the outer periphery thereof for the flow of a cooling liquid therethrough; friction material mounted upon a set of said discs and having generally radially extending grooves in the outer surface thereof for the flow of a cooling liquid therethrough; and means for circulating the cooling liquid through said housing and said passageways and grooves to effect cooling of said rotor and stator discs.

17. A friction device comprising: a housing; a rotor journalled for rotation in said housing; a diaphragm in said housing cooperating with one wall thereof to provide a chamber for operating fluid under pressure; means for admitting operating fluid into and exhausting operating fluid from said chamber; at least one rotor disc in said housing carried by said rotor; a backing plate in said housing non-rotatable relative thereto, said plate being actuatable by said diaphragm and disposed between said diaphragm and said rotor disc; and heat insulating material disposed between said diaphragm and backing plate to prevent the transfer of heat from said backing plate to said diaphragm.

EARL R. JOHNSON.
HARLAND W. CARDWELL.

REFERENCES CITED

The following references are of record in the file of this patent:

UNITED STATES PATENTS

| Number | Name | Date |
|---|---|---|
| Re. 12,683 | Sturtevant | Aug. 27, 1907 |
| 854,720 | Dawson | May 28, 1907 |
| 2,152,489 | Lamb | Mar. 28, 1939 |
| 2,262,709 | Lambert | Nov. 11, 1941 |
| 2,381,393 | Brown | Aug. 7, 1945 |

FOREIGN PATENTS

| Number | Country | Date |
|---|---|---|
| 243,557 | Germany | Feb. 16, 1912 |